(12) United States Patent
Fukuda et al.

(10) Patent No.: US 6,970,218 B2
(45) Date of Patent: Nov. 29, 2005

(54) SEMI-TRANSMISSIVE LCD DEVICE INCLUDING AN OPTICAL FILM HAVING NEGATIVE UNIAXIAL DOUBLE REFRACTIVE INDEX ELLIPSOIDS

(75) Inventors: Koichi Fukuda, Mobara (JP); Yoshiaki Nakamura, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 70 days.

(21) Appl. No.: 10/777,166

(22) Filed: Feb. 13, 2004

(65) Prior Publication Data

US 2004/0174478 A1    Sep. 9, 2004

(30) Foreign Application Priority Data

Mar. 7, 2003   (JP) .............................. 2003-060986

(51) Int. Cl.[7] ..................... G02F 1/1335; G02F 1/1333
(52) U.S. Cl. ..................... 349/114; 349/113; 349/117; 349/118; 349/119; 349/120; 349/121; 349/122
(58) Field of Search .................. 257/59, 72; 359/37, 359/60, 63, 70, 73, 75, 93; 349/113, 114, 349/117–122

(56) References Cited

U.S. PATENT DOCUMENTS 5,753,937 A    5/1998   Shimomaki et al.
6,778,242 B1 *  8/2004   Murayama et al. .......... 349/117
6,819,379 B2 * 11/2004   Kubo et al. ................. 349/114

FOREIGN PATENT DOCUMENTS

JP          7-333598         6/1994

* cited by examiner

Primary Examiner—Robert H. Kim
Assistant Examiner—Lucy Chien
(74) Attorney, Agent, or Firm—Reed Smith LLP; Stanley P. Fisher, Esq.; Juan Carlos A. Marquez, Esq.

(57) ABSTRACT

The present invention provides a liquid crystal display device. An optical film having negative uniaxial double refractive index ellipsoids is arranged below a semi-transmitting liquid crystal display cell and, thereafter, a λ/4 phase difference plate, a λ/2 phase difference plate and a polarizer are arranged. The orientation axis direction of the optical film having negative uniaxial double refractive index ellipsoids is substantially equal to the direction which is rotated by 90° in the clockwise direction from a resultant vector of the orientation axis direction of the upper orientation film and the orientation axis direction of the lower orientation film of the liquid crystal display cell. Further, phase lagging axis of the upper and lower λ/4 phase difference plate is set substantially equal to the orientation axis direction of the optical film having negative uniaxial double refractive index ellipsoids.

10 Claims, 11 Drawing Sheets

SEMI-TRANSMISSIVE LCD DEVICE INCLUDING AN OPTICAL FILM HAVING NEGATIVE UNIAXIAL DOUBLE REFRACTIVE INDEX ELLIPSOIDS

BACKGROUND OF THE INVENTION

1. Field of the Invention

The present invention relates to a liquid crystal display device, and more particularly to a reflective type liquid crystal display device for displaying images using light incident from an observation side, and a semi-transmissive type liquid crystal display device for displaying images by selectively or simultaneously using transmitting light incident from a side opposite to the observation side and light incident from the observation side.

2. Description of the Related Art

The liquid crystal display device is thin, light-weighted and exhibits the low power consumption and hence, the liquid crystal display device has been used as a display device in a wide range of electronic equipments including a notebook-type personal computer, a word processor, an electronic notebook, a mobile phone, a camera-built-in video recorder and the like. Unlike a cathode ray tube and a plasma display device, the liquid crystal display device is not self-luminescent and displays images or the like by controlling a quantity of light incident from the outside. Further, it is possible to perform a color image display of multi colors with the use of color filters in plural colors as light control elements.

This type of liquid crystal display device sandwiches a liquid crystal layer between a pair of substrates (hereinafter, referred to as "an upper substrate" and "a lower substrate") and visualizes an electronic latent image by controlling the orientation of molecules of the liquid crystal composition which constitutes the liquid crystal layer in response to an electric field applied to the liquid crystal layer.

The liquid crystal display device is classified, in accordance with a driving method, into a simple matrix type liquid crystal display device and an active matrix type liquid crystal display device. The currently-available liquid crystal display device is capable of performing a high-definition and high-speed display and hence, the active matrix type liquid crystal display devices are mainly used. In the active matrix type liquid crystal display device, active elements (switching elements) which are represented by thin film transistors for pixel selection are provided to the above-mentioned lower substrate or upper substrate and color filters colored in three colors separately for color display are provided to either one of these substrates. In a reflective-type liquid crystal display device, images are displayed by using light incident from an observation side, while in a semi-transmissive type liquid crystal display device, images are displayed by selectively or simultaneously using a transmitting light incident from a side opposite to the observation side and light incident from the observation side.

Since the liquid crystal display device is not a self-luminous type display device, it is necessary to visualize an electronic latent image with illumination composed of a visible light and to emit the visualized image as an image light to an observation surface. A method which emits the illumination light such as a natural light (an external light) or the like from the observation surface side is referred to as a reflective type, while a method which emits an illumination light from a side opposite to the observation surface is referred to as a transmissive type. Further, a liquid crystal display device which adopts both of the method which emits the illumination light from the observation surface side and the method which emits the illumination light from the side opposite to the observation surface is referred to as a semi-transmissive type (a semi-transmissive/reflective type). Here, a liquid crystal display cell which is formed into a semi-transmissive type by providing reflecting plates to a lower substrate and by forming openings in portions of the reflecting plates has been commercialized. As a document which discloses this type of art, JP-A-7-333598 (a patent document 1) can be named.

FIG. 13 is a schematic cross-sectional view of the vicinity of one pixel for explaining a constitutional example of the semi-transmissive type liquid crystal display device. A liquid crystal display device PNL is formed by stacking various types of optical members described later to a liquid crystal display cell LCD which is constituted of a lower substrate SUB1 preferably made of glass and having reflecting plates (reflecting electrodes) RF and transparent pixel electrodes ITO1 on an inner surface thereof and an upper substrate SUB2 having a transparent common electrode ITO2 on an inner surface thereof which faces the lower substrate SUB1 in an opposed manner and laminated to the lower substrate SUB1 with a liquid crystal layer LC sandwiched therebetween.

Here, thin film transistors are formed on the lower substrate SUB1 as active elements. Each thin film transistor is constituted of a gate electrode GT having an anodized film AO on a surface of aluminum and neodymium (Al—Nd), a gate insulation film GI made of silicon nitride (SiN), a silicon semiconductor film Si, a source electrode SD1 and a drain electrode SD2. The pixel electrode ITO1 which is formed of a transparent electrode is connected to the source electrode SD1. A passivation film PAS which is formed of an insulation film is formed such that the passivation film PAS covers the source electrodes SD1 and the drain electrodes SD2, while the reflecting electrodes RF are formed over the passivation film PAS. The reflecting electrode RF is connected to the source electrode SD1 via a contact hole CH formed in the passivation film PAS in a penetrating manner. The reflecting electrode RF has a function of a reflecting plate and a function of a pixel electrode.

An opening ST which is formed by cutting off the reflecting electrode RF is provided to a portion of the reflecting electrode RF thus forming a semi-transmissive reflection film which allows light incident from outside (lower side in FIG. 13) of the lower substrate SUB1 to pass through the liquid crystal layer LC toward the upper substrate SUB2 side. In the drawing, a symbol Cadd indicates an additional capacitance of the pixel and generates a given capacitance using the passivation film PAS provided between the electrode which is formed as a film simultaneously with the gate electrode GT and the reflecting electrode RF as a dielectric layer. Further, to an uppermost layer which is brought into contact with the liquid crystal layer LC, a lower orientation film ORI1 is applied and the orientation treatment in a given direction is applied to the lower orientation film ORI1. Although there may be a liquid crystal display device which is provided with a leveling film below the lower orientation film ORI1, the leveling film is not shown in the drawing here. Following optical members are stacked on upper and lower surfaces of the liquid crystal display cell LCD. Here, spacers which define a distance between upper and lower substrates are omitted from FIG. 13.

First of all, on an outer surface of the lower substrate SUB1 of the liquid crystal display cell LCD, a lower $\lambda/4$ phase difference plate PSQ1, a lower $\lambda/2$ phase difference plate PSH1 and a lower polarizer POL1 are stacked in this order. On the other hand, over an inner surface of the upper substrate SUB2, color filters CF of three colors (R, G, B) which are defined by a black matrix BM are formed. The color filters CF are covered with a leveling film OC2 and the common electrode ITO2 is further formed over the leveling film OC2 (only one color filter shown in FIG. 13). Then, to an uppermost layer which is brought into contact with the liquid crystal layer LC, an upper orientation film ORI2 is applied and the orientation treatment in a given direction is applied to the upper orientation film ORI2. In this constitutional example, an opening HL which enhances the brightness by directly emitting a reflecting light from the reflecting electrode RF to the upper substrate SUB2 is formed in a portion of the color filter CF. However, the opening HL is not an inevitable constitutional feature. On an outer surface (observation side) of the upper substrate SUB2, an upper λ/4 phase difference plate PSQ2, an upper λ/2 phase difference plate PSH2 and an upper polarizer POL2 are stacked in this order. Here, the upper λ/4 phase difference plate PSQ2 is adhered to the upper substrate SUB2 using a diffusion tacky adhesive layer SC.

FIG. 14 is a developed view for specifically explaining one example of the stacked structure of respective optical members in the liquid crystal display device shown in FIG. 13. On the upper side (observation side) of the semi-transmissive type liquid crystal display cell LCD, the upper λ/4 phase difference plate PSQ2, the upper λ/2 phase difference plate PSH2 and the upper polarizer POL2 are stacked in this order. Further, on the lower side of the liquid crystal display cell LCD, the lower λ/4 phase difference plate PSQ1, the lower λ/2 phase difference plate PSH1 and the lower polarizer POL1 are stacked in this order thus constituting the liquid crystal display device PNL as a whole.

SUMMARY OF THE INVENTION

With respect to angles of respective optical axes in the above-mentioned conventional semi-transmissive type liquid crystal display device, viewing angles are narrow and the intensities of the transmitting light are asymmetrical with respect to left and right viewing angles and hence, there arises a color tone shift in the left and right viewing-angle directions in a color display. This has been one of the tasks to be solved by the present invention.

It is an advantage of the present invention to provide a semi-transmissive type liquid crystal display device which realizes image display of high quality with no color tone shift in left and right viewing-angle directions by enhancing contrast and by having high-luminance and wide viewing angles by enlarging viewing angles.

According to the present invention, an optical film having negative uniaxial double refractive index ellipsoids is provided to a lower side (a surface opposite to an observation side) of a semi-transmissive type liquid crystal display cell and, thereafter, a phase difference plate corresponding to λ/4 (a λ/4 phase difference plate), a phase difference plate corresponding to λ/2 (a λ/2 phase difference plate) and a polarizer are arranged in a stacked manner in this order. Here, the orientation axis direction of the optical film having negative uniaxial double refractive index ellipsoids is substantially equal to the direction which is rotated in the clockwise direction by 90° from a resultant vector of the orientation axis direction of an upper orientation film and the orientation axis direction of a lower orientation film of the liquid crystal display cell, and phase lagging axes of the upper and lower phase difference plates corresponding to λ/4 are set substantially equal to the orientation axis direction of the optical film having negative uniaxial double refractive index ellipsoids. Here, in a case of a twist angle 0° at which the resultant vector of the orientation axes of the upper and lower orientation films disappears, the orientation axis direction of the optical film having negative uniaxial double refractive index ellipsoids is set substantially equal to the orientation axis direction of the lower orientation film of the liquid crystal display cell.

Further, by using a three-dimensional refractive index control type phase difference plate as the lower and/or upper λ/4 phase difference plates, it is possible to obtain a further wider viewing angle. Here, an $N_Z$ coefficient indicative of a three-dimensional refractive index is preferably set to $-1 \leq N_Z < 1$. Here, an $N_Z$ coefficient is expressed by a following formula.

$$N_Z = (n_x - n_z)/(n_x - n_y)$$

$n_x$: refractive index in the phase lagging axis direction $n_y$: refractive index in the phase advancing axis direction $n_z$: refractive index in the planar normal direction With the provision of the optical film disposed below the semi-transmissive type liquid crystal display cell and having negative uniaxial double refractive index ellipsoids, the viewing angle of the semi-transmissive type liquid crystal display device can be compensated and hence, a viewing angle of the transmitting light can be enlarged without damaging the reflection optical characteristics. Further, by adopting the three-dimensional refractive index control type phase difference plate as the λ/4 phase difference plate, the viewing angle of the transmitting light can be further enlarged.

To describe one example of the constitutional features of the liquid crystal display device according to the present invention, it is as follows. That is, in a liquid crystal display device including:

a semi-transmissive type liquid crystal display cell having a lower substrate, an upper substrate which constitutes an observation side, a liquid crystal layer sandwiched between the lower substrate and the upper substrate, a lower orientation film which is formed over a surface of the lower substrate which is brought into contact with the liquid crystal layer, and an upper orientation film formed over a surface of the upper substrate which is brought into contact with the liquid crystal layer;

an upper polarizer arranged at a side of the upper substrate opposite to the liquid crystal layer;

an upper λ/2 phase difference plate arranged between the upper polarizer and the upper substrate;

an upper λ/4 phase difference plate arranged between the upper λ/2 phase difference plate and the upper substrate;

a lower polarizer arranged at a side of the lower substrate opposite to the liquid crystal layer;

a lower λ/2 phase difference plate arranged between the lower polarizer and the lower substrate;

a lower λ/4 phase difference plate arranged between the lower λ/2 phase difference plate and the lower substrate; and an optical film having negative uniaxial double refractive index ellipsoids arranged between the lower λ/4 phase difference plate and the lower substrate, wherein a twist angle of the liquid crystal layer is larger than 0° and equal to or smaller than 90°, the orientation axis direction of the optical film having negative uniaxial double refractive index ellipsoids is arranged within a range of −5° to +5° with respect to the direction which is rotated by 90° in the clockwise direction from a resultant vector of the orientation axis direction of the upper orientation film and the orientation axis direction of the lower orientation film of the liquid crystal display cell, and a phase lagging axis of the lower λ/4 phase difference plate is arranged within a range of −10° to +10° with respect to the orientation axis direction of the optical film having negative uniaxial double refractive index ellipsoids, and a phase lagging axis of the upper λ/4 phase difference plate is arranged within a range of −5° to +5° with respect to the direction which is rotated 90° in the clockwise direction from a resultant vector of the orientation axis direction of the upper orientation film and the orientation axis direction of the lower orientation film of the liquid crystal display cell.

Further, according to the present invention, in a liquid crystal display device including:

a semi-transmissive type liquid crystal display cell having a lower substrate, an upper substrate which constitutes an observation side, a liquid crystal layer sandwiched between the lower substrate and the upper substrate, a lower orientation film which is formed over a surface of the lower substrate which is brought into contact with the liquid crystal layer, and an upper orientation film formed over a surface of the upper substrate which is brought into contact with the liquid crystal layer;

an upper polarizer arranged at a side of the upper substrate opposite to the liquid crystal layer;

an upper λ/2 phase difference plate arranged between the upper polarizer and the upper substrate;

an upper λ/4 phase difference plate arranged between the upper λ/2 phase difference plate and the upper substrate;

a lower polarizer arranged at a side of the lower substrate opposite to the liquid crystal layer;

a lower λ/2 phase difference plate arranged between the lower polarizer and the lower substrate;

a lower λ/4 phase difference plate arranged between the lower λ/2 phase difference plate and the lower substrate; and an optical film having negative uniaxial double refractive index ellipsoids arranged between the lower λ/4 phase difference plate and the lower substrate, wherein a twist angle of the liquid crystal layer is 0°, the orientation axis direction of the optical film having negative uniaxial double refractive index ellipsoids is arranged within a range of −5° to +5° with respect to the orientation axis direction of the lower orientation film of the liquid crystal display cell, a phase lagging axis of the lower λ/4 phase difference plate is arranged within a range of −10° to +10° with respect to the orientation axis direction of the optical film having negative uniaxial double refractive index ellipsoids, and a phase lagging axis of the upper λ/4 phase difference plate is arranged within a range of −5° to +5° with respect to the orientation axis direction of the upper orientation film of the liquid crystal display cell.

Here, either one or both of the lower λ/4 phase difference plate and the upper λ/4 phase difference plate are formed of a three-dimensional refractive index control type phase difference plate having a $N_Z$ coefficient of $-1 \leq N_Z < 1$, wherein the $N_Z$ coefficient indicates a three-dimensional refractive index of the three-dimensional refractive index control type phase difference plate.

That is, the present invention may form the lower λ/4 phase difference plate using the three-dimensional refractive index control type phase difference plate or may form the upper λ/4 phase difference plate using the three-dimensional refractive index control type phase difference plate, or may form the both of the lower λ/4 phase difference plate and upper λ/4 phase difference plate using the three-dimensional refractive index control type phase difference plate.

The semi-transmissive type liquid crystal display device of the present invention may be also constituted such that by mounting an auxiliary illumination device (also referred to as a back light) on a back surface of the lower substrate side of the liquid crystal display cell, the brighter image display can be obtained. Due to such a constitution, the semi-transmissive type liquid crystal display device can have the high light transmitting property with a wide viewing angle and can obtain displayed images having the favorable symmetry in the left-and-right direction.

In this manner, according to the present invention, by making use of the reflecting light of the external light or by selectively or simultaneously making use of the transmitting light and the reflecting light, in both of an environment having a bright external light and a dark environment, it is possible to obtain a bright and clear image having a wide viewing angle and a high contrast ratio. Further, it is also possible to obtain a color image display of high quality having no color tone shift. It is needless to say that the present invention is not limited to the above-mentioned respective constitutions and the constitution of embodiments described later and various modifications are conceivable without departing from the technical concept of the present invention.

DESCRIPTION OF THE PREFERRED EMBODIMENTS

Figure 1:
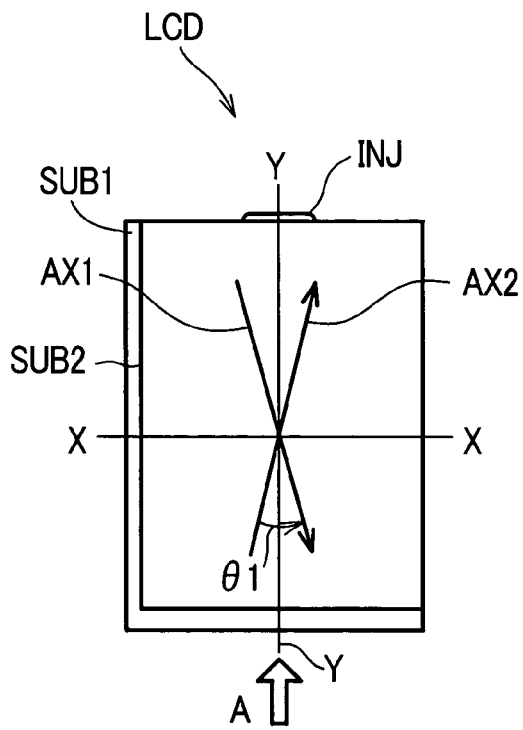
FIG. 1 is an explanatory view of an example of appearance of a liquid crystal display cell and a twist angle of liquid crystal molecules according to the present invention.
Figure 2:
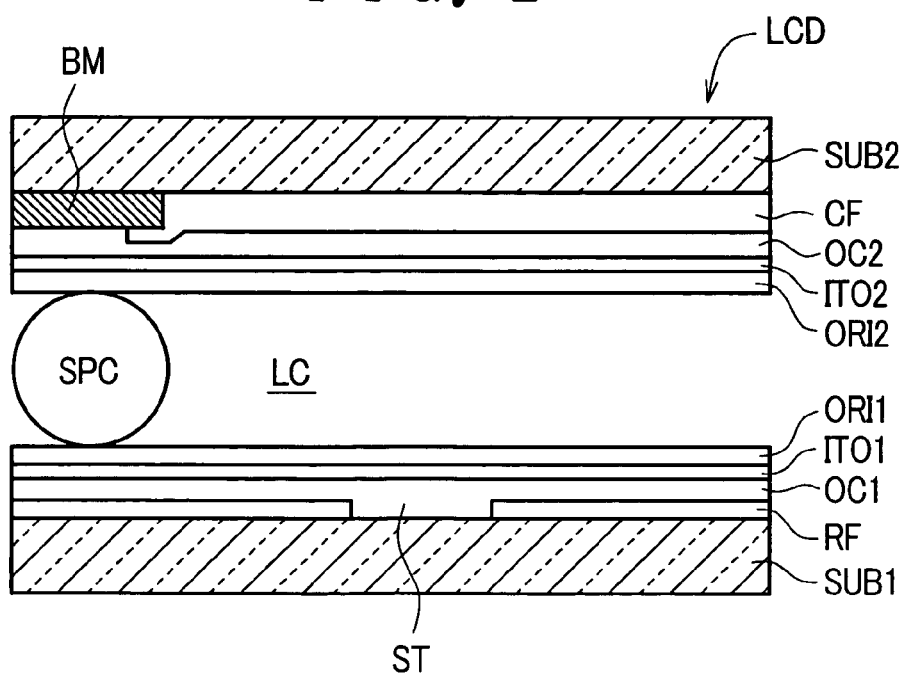
FIG. 2 is a cross-sectional view for explaining the structure of the vicinity of one pixel of the liquid crystal display cell shown in FIG. 1.
Figure 13:
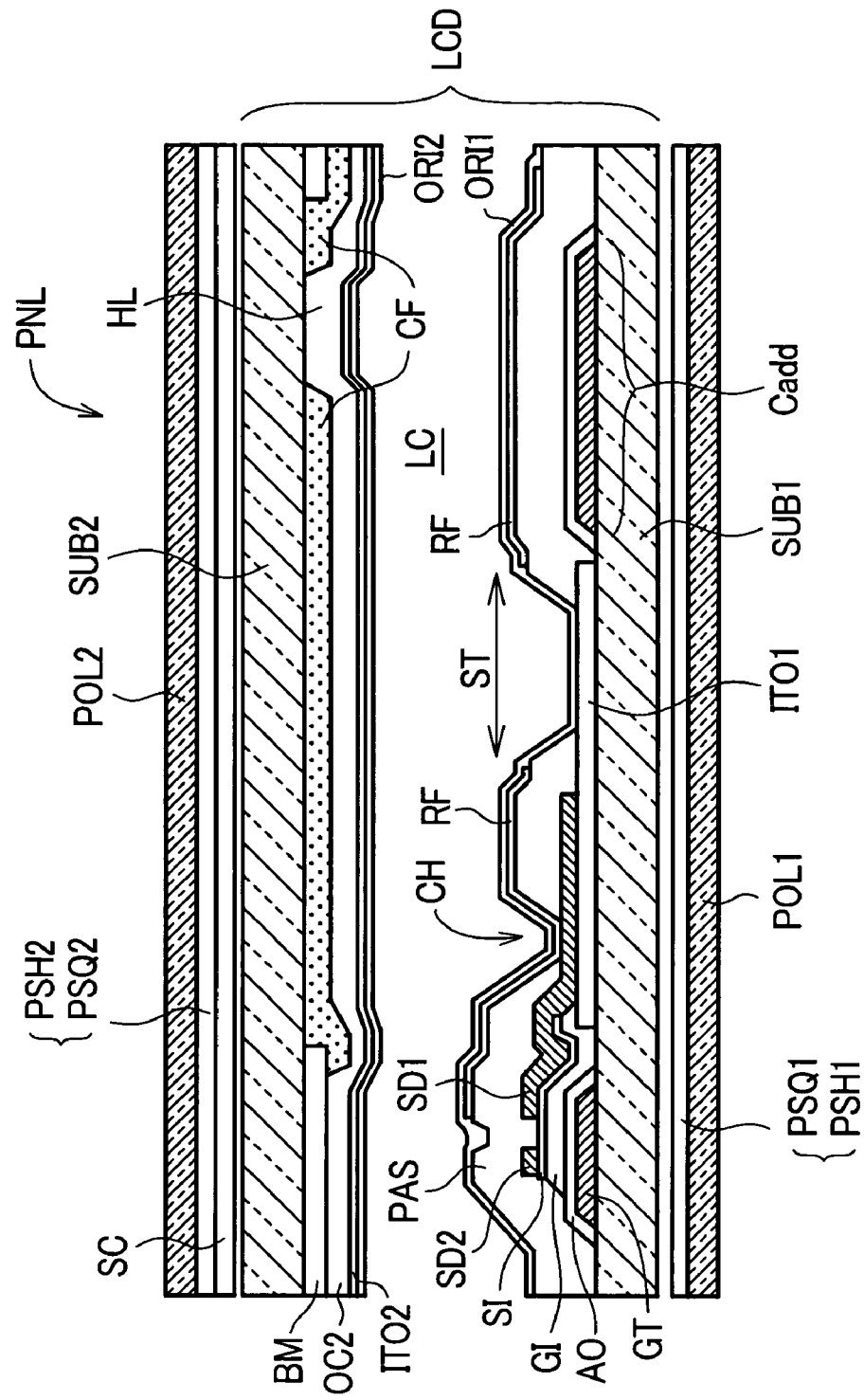
FIG. 13 is a schematic cross-sectional view of the vicinity of one pixel for explaining a constitutional example of a semi-transmissive type liquid crystal display device.
Figure 14:
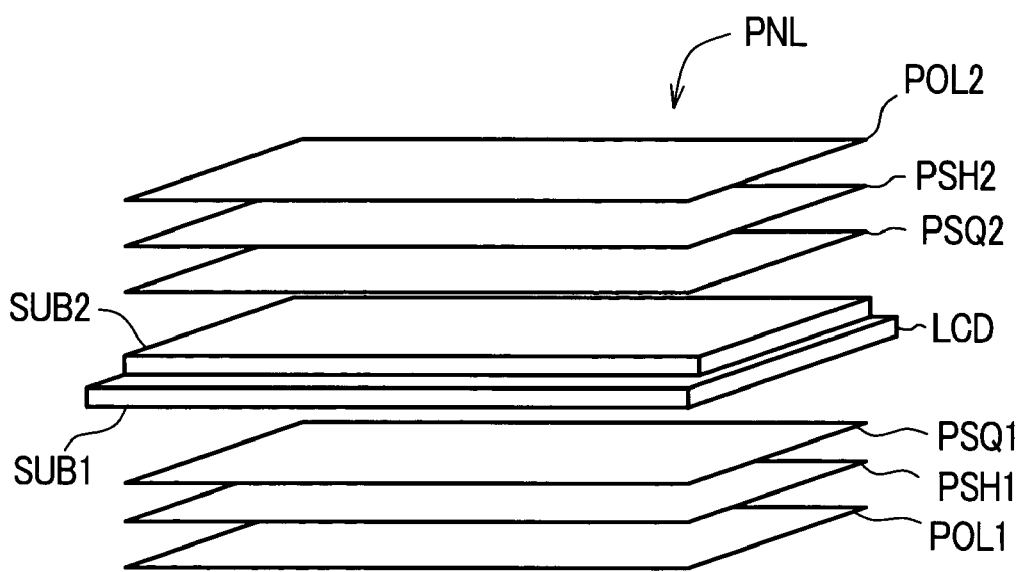
FIG. 14 is a developed view for specifically explaining one example of the stacked structure of the respective optical members according to the liquid crystal display device shown in FIG. 13.
Figure 14:
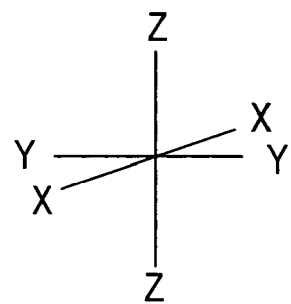

Embodiments of a liquid crystal display device according to the present invention are explained hereinafter in conjunction with drawings showing the embodiments. FIG. 1 is an explanatory view of an example of appearance of a liquid crystal display cell and a twist angle of liquid crystal molecules according to the present invention, and FIG. 2 is a cross-sectional view for explaining the structure of the vicinity of one pixel of the liquid crystal display cell shown in FIG. 1. Here, in FIG. 2, the thin film transistor explained in conjunction with FIG. 13 is omitted from the drawing. Although the liquid crystal display cell LCD shown in FIG. 2 corresponds to a modification of the liquid crystal display cell LCD shown in FIG. 13, the liquid crystal display cell LCD shown in FIG. 13 can be directly used as it is in the present invention. The liquid crystal display cell LCD is configured such that liquid crystal LC is filled in a gap defined by laminating a lower substrate SUB1 and an upper substrate SUB2 which are preferably made of glass. The gap (cell gap) between both substrates is defined by spacers SPC. The liquid crystal LC is injected into the gap through a liquid crystal injection opening INJ and the liquid crystal injection opening INJ is plugged by a suitable resin after injecting the liquid crystal LC.

Over an inner surface of a lower substrate SUB1, reflecting plates RF which preferably have a light diffusion function are formed. Further, over the reflecting plates RF, a leveling film OC1, the pixel electrodes ITO1 which are formed of a transparent electrode and a lower orientation film ORI1 are formed in this order. Here, the reflecting plates RF may be reflecting electrodes RF as has been explained in conjunction with FIG. 13. Further, over an inner surface of an upper substrate SUB2, color filters CF of three colors which are defined by a black matrix BM are formed (in FIG. 2, only one of the color filters of three colors is shown). Above these color filters CF, a leveling film OC2, a common electrode ITO2 which is formed using a transparent electrode, and an upper orientation film ORI2 are formed in this order. The orientation axis (orientation axis direction) of the lower orientation film ORI1 in FIG. 2 is indicated by AX1 in FIG. 1 and the orientation axis (orientation axis direction) of the upper orientation film ORI2 is indicated by AX2 in FIG. 1. Due to such a constitution, a viewing angle enlarging direction A is formed. Further, a twist angle of the liquid crystal molecules which constitute the liquid crystal LC assumes θ1. Here, X—X in FIG. 1 indicates the left-and-right direction and Y—Y indicates the up-and-down direction.

Figure 3:
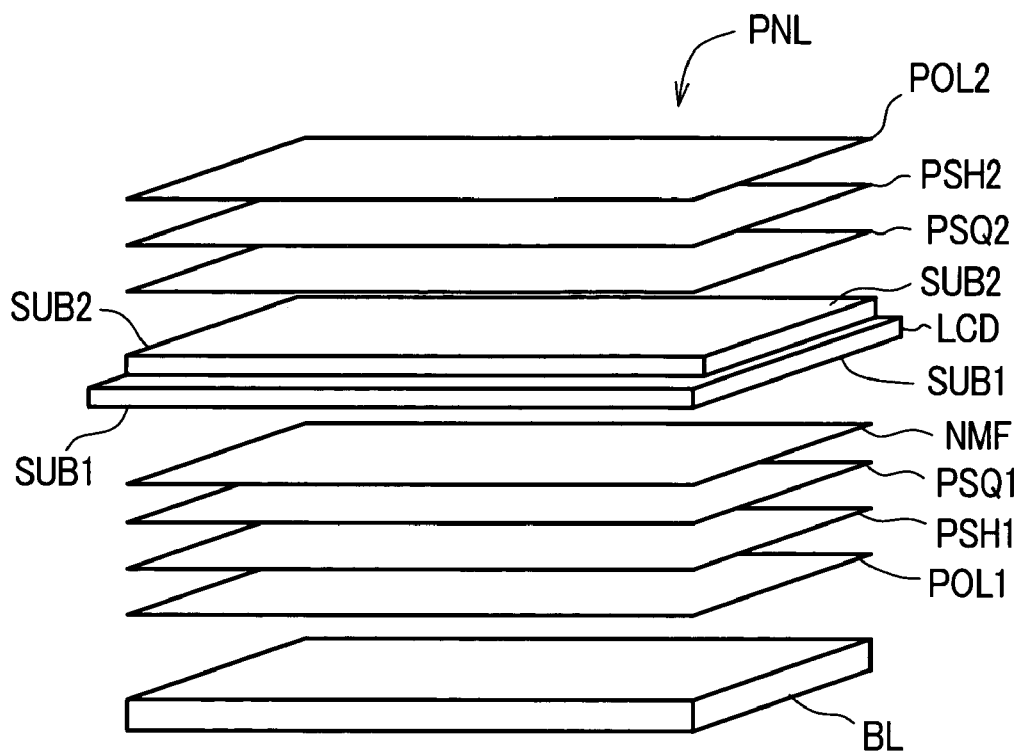
FIG. 3 is a developed view for explaining the stacked structure of respective optical members in the first embodiment of the liquid crystal display device according to the present invention.

FIG. 3 is a developed view for explaining the stacked structure of respective optical members in the first embodiment of the liquid crystal display device according to the present invention. Above (observation side) the semi-transmissive type liquid crystal display cell LCD, an upper λ/4 phase difference plate PSQ2, an upper λ/2 phase difference plate PSH2 and an upper polarizer POL2 are stacked in this order. Below the semi-transmissive type liquid crystal display cell LCD, an optical film NMF having negative uniaxial double refractive index ellipsoids is provided. Further, over the optical film NMF, a λ/4 phase difference plate PSQ1, a λ/2 phase difference plate PSH1 and a lower polarizer POL1 are stacked and arranged in this order. Further, BL in FIG. 3 indicates a backlight.

The orientation axis direction AX3 (not shown in the drawing) of the optical film NMF having negative uniaxial double refractive index ellipsoids is set substantially equal to the direction which is rotated 90° in the clockwise direction from a resultant vector of the orientation axis direction AX2 of the upper orientation film ORI2 and the orientation axis direction AX1 of the lower orientation film ORI1 of the liquid crystal display cell LCD. Further, phase lagging axes AX7, AX4 (not shown in the drawing) of the upper and lower λ/4 phase difference plates PSQ2, PSQ1 are arranged substantially equal to the orientation axis direction AX3 of the optical film NMF having negative uniaxial double refractive index ellipsoids. Here, at a twist angle 0° where the resultant vector of the orientation axes AX2, AX1 of the upper and lower orientation film ORI2, ORI1 is not present, the orientation axis direction AX3 of the optical film NMF having negative uniaxial double refractive index ellipsoids is arranged substantially equal to the orientation axis direction AX1 of the lower orientation film ORI1 of the liquid crystal display cell LCD.

Figure 4:
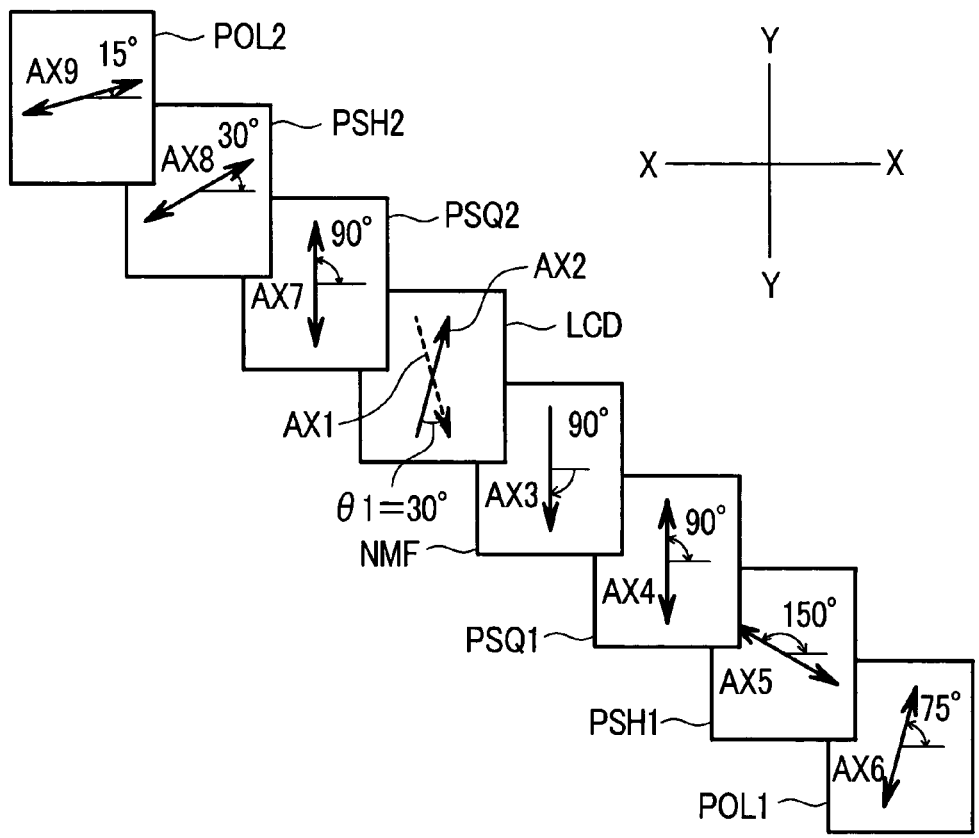
FIG. 4 is an explanatory view of the arrangement of optical axes of respective optical members of the liquid crystal display device having the stacked structure shown in FIG. 3.

FIG. 4 is an explanatory view of the arrangement of optical axes of respective optical members of the liquid crystal display device having the stacked structure shown in FIG. 3. Hereinafter, with respect to the optical axes of the optical members, the counterclockwise direction as viewed from an observation side surface is defined as "+" and the clockwise direction as viewed from the observation side surface is defined as "−". Further, the absorption axes AX9, AX6 of the upper and lower polarizer POL2, POL1 may be used as transmission axes. Further, light diffusion means such as diffusion tacky adhesive agent or the like may be interposed between the semi-transmissive type liquid crystal display cell LCD and the upper λ/4 phase difference plate PSQ2, between the upper λ/4 phase difference plate PSQ2 and the upper λ/2 phase difference plate PSH2 and between the upper λ/2 phase difference plate PSH2 and the upper polarizer POL2. Further, a brightness promoting film adopting a polarization separation method may be arranged outside the lower polarizer POL1.

In the semi-transmissive type liquid crystal display cell LCD, Δnd of the transmitting portion at the wavelength of 550 nm is set to a value within a range of 250 nm to 400 nm (preferably, 300 nm). Then, Δnd of the reflecting portion at the wavelength of 550 nm is set to a value within a range of 130 nm to 250 nm (preferably, 200 nm). Further, a twist angle (angle formed between the orientation axis AX1 of the lower orientation film ORI1 and the orientation axis AX2 of the upper orientation film ORI2) θ1 of liquid crystal molecules falls within a range of 0° to 90°. Further, in this embodiment, in the same manner as FIG. 1, the twist angle is set to 30°.

The phase lagging axis AX7 of the upper λ/4 phase difference plate PSQ2 is arranged within a range of −5° to +5° with respect to the direction which is rotated by 90° in the clockwise direction from a resultant vector of the orientation axis direction AX2 of the upper orientation film ORI2 and the orientation axis direction AX1 of the lower orientation film ORI1 of the liquid crystal display cell LCD. In this embodiment, the angle is set to 0°. The phase lagging axis AX8 of the upper λ/2 phase difference plate PSH2 is arranged at an angle within a range of −70° to −50° from the phase lagging axis AX7 of the upper λ/4 phase difference plate PSQ2 and, in this embodiment, the angle is set to −60°. The absorption axis AX9 of the upper polarizer POL2 is arranged at an angle within a range of −25° to −5° from the phase lagging axis AX8 of the upper λ/2 phase difference plate PSH2 and, in this embodiment, the angle is set to −15°. Δnd (valley value) of the upper λ/4 phase difference plate PSQ2 is set to a value within a range of 50 nm to 200 nm and, in this embodiment, the Δnd is set to 100 nm. Δnd (valley value) of the upper λ/2 phase difference plate PSH2 is set to a value within a range of 200 nm to 300 nm and, in this embodiment, the Δnd is set to 255 nm.

The orientation axis direction AX3 of the optical film NMF having negative uniaxial double refractive index ellipsoids is arranged within an inclination range of −5° to +5° with respect to the direction (downward direction in FIG. 4) which is rotated by 90° in the clockwise direction from a resultant vector (right direction in FIG. 4) of the orientation axis direction AX2 of the upper orientation film ORI2 and the orientation axis direction AX1 of the lower orientation film ORI1 of the liquid crystal display cell LCD. Here, in this embodiment, this inclination is set to 0°. Further, at a twist angle 0° where the resultant vector of the orientation axis directions AX2, AX1 of the upper and lower orientation film ORI2, ORI1 is not present, the orientation axis direction AX3 of the optical film NMF is arranged within an inclination range of −5° to +5° with respect to the orientation axis direction AX1 of the lower orientation film ORI1.

Figure 5:
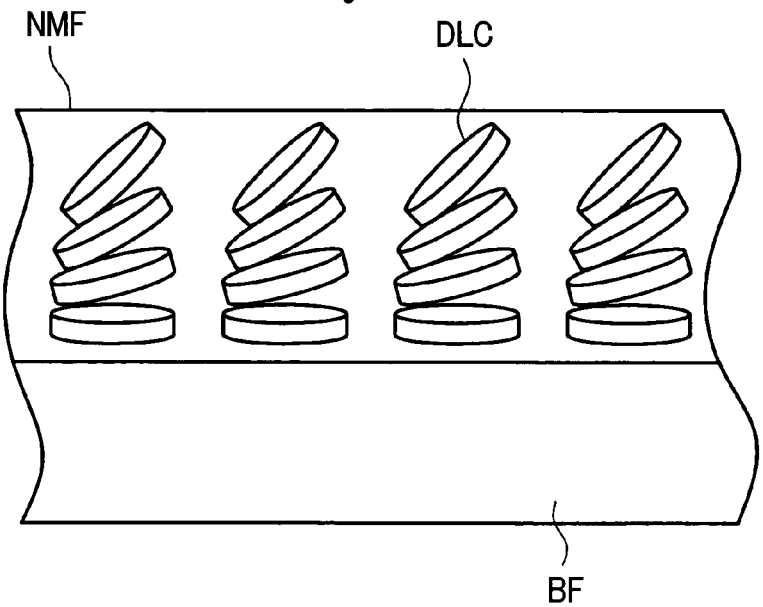
FIG. 5 is a schematic cross-sectional view for explaining the structure of an optical film having negative uniaxial double refractive index ellipsoids.
Figure 5:
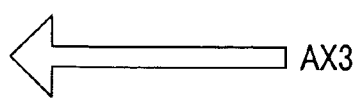

FIG. 5 is a schematic cross-sectional view for explaining the structure of the optical film having negative uniaxial double refractive index ellipsoids. The optical film NMF having negative uniaxial double refractive index ellipsoids is produced by performing the hybrid orientation of discotic liquid crystal DLC in a uniaxial direction on a base film BF. Light which passes through the optical film NMF receives an action of the discotic liquid crystal DLC which is subjected to the hybrid orientation and hence, the light is irradiated as light having the direction (the orientation axis direction AX3 in the FIG. 5) along which the birefringence changes corresponding to the incident angle of the transmitting light which is opposite to the direction (viewing angle enlarging direction A in FIG. 1) along which the birefringence of the liquid crystal cell LCD changes.

The phase lagging axis AX4 of the lower λ/4 phase difference plate PSQ1 is arranged at an angle within a range of −10° to +10° with respect to the orientation axis direction AX3 of the optical film NMF having negative uniaxial double refractive index ellipsoids. In this embodiment, the angle is set to 0°. The phase lagging axis AX5 of the lower λ/2 phase difference plate PSH1 is arranged at an angle within a range of 50° to 70° from the phase lagging axis direction AX4 of the lower λ/4 phase difference plate PSQ1. In this embodiment, the angle is set to 60°. The absorption axis AX6 of the lower polarizer POL1 is arranged at an angle within a range of −85° to −65° from the phase lagging axis AX5 of the lower λ/2 phase difference plate PSH1. In this embodiment, the angle is set to −75°. Δnd (valley value) of the lower λ/4 phase difference plate PSQ1 is set to a value within a range of 50 nm to 200 nm. In this embodiment, the Δnd is set to 140 nm. Δnd (valley value) of the lower λ/2 phase difference plate PSH1 is set to a value within a range of 200 nm to 300 nm. In this embodiment, the Δnd is set to 260 nm.

Due to the constitution of this embodiment, by using a reflecting light of an external light or by selectively or simultaneously using a transmitting light and a reflecting light, in both of an environment having a bright external light and a dark environment, bright clear images having a wide viewing angle and a high contrast ratio can be obtained and, further, color image display device of a high quality with no color tone shift can be obtained.

Figure 6:
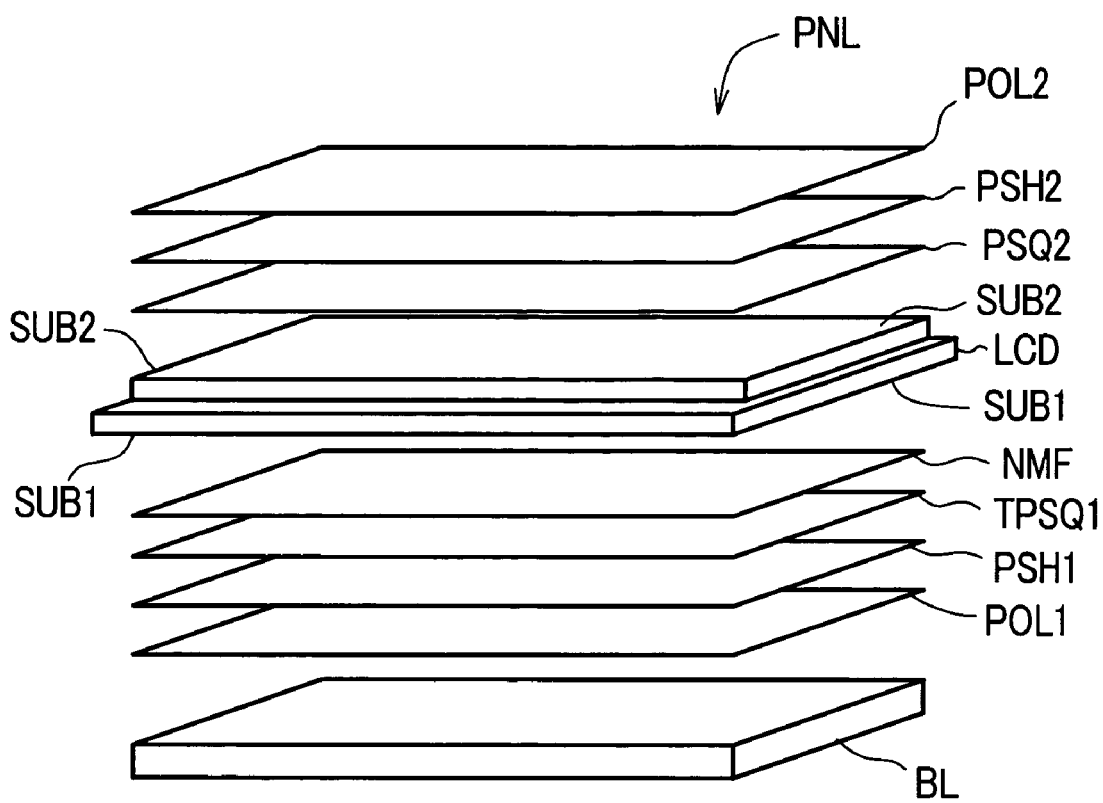
FIG. 6 is a developed view for explaining the stacked structure of respective optical members in the second embodiment of the liquid crystal display device according to the present invention.

FIG. 6 is a developed view for explaining the stacked structure of respective optical members in the second embodiment of the liquid crystal display device according to the present invention. Above (observation side) a semi-transmissive type liquid crystal display cell LCD, in the same manner as the first embodiment, an upper λ/4 phase difference plate PSQ2, an upper λ/2 phase difference plate PSH2 and an upper polarizer POL2 are stacked in this order. Further, below the semi-transmissive type liquid crystal display cell LCD, an optical film NMF having negative uniaxial double refractive index ellipsoids is formed. Then, over the optical film NMF, a lower three-dimensional refractive index control type phase difference plate TPSQ1 corresponding to λ/4, a λ/2 phase difference plate PSH1 and a lower polarizer POL1 are stacked in this order.

The orientation axis direction AX3 of the optical film NMF having negative uniaxial double refractive index ellipsoids is arranged substantially equal to the direction which is rotated 90° in the clockwise direction from a resultant vector of the orientation axis direction AX2 of the upper orientation film ORI2 and the orientation axis direction AX1 of the lower orientation film ORI1 of the liquid crystal display cell LCD and, at the same time, the phase lagging axes AX7, AX4 of the upper and lower λ/4 phase difference plates PSQ2, TPSQ1 are arranged substantially equal to the orientation axis direction AX3 of the optical film NMF having negative uniaxial double refractive index ellipsoids. Here, at a twist angle 0° where the resultant vector of the orientation axes AX2, AX1 of the upper and lower orientation films ORI2, ORI1 is not present, the orientation axis direction AX3 of the optical film NMF having negative uniaxial double refractive index ellipsoids is arranged substantially equal to the orientation axis direction AX1 of the lower orientation film ORI1 of the liquid crystal display cell LCD.

Figure 7:
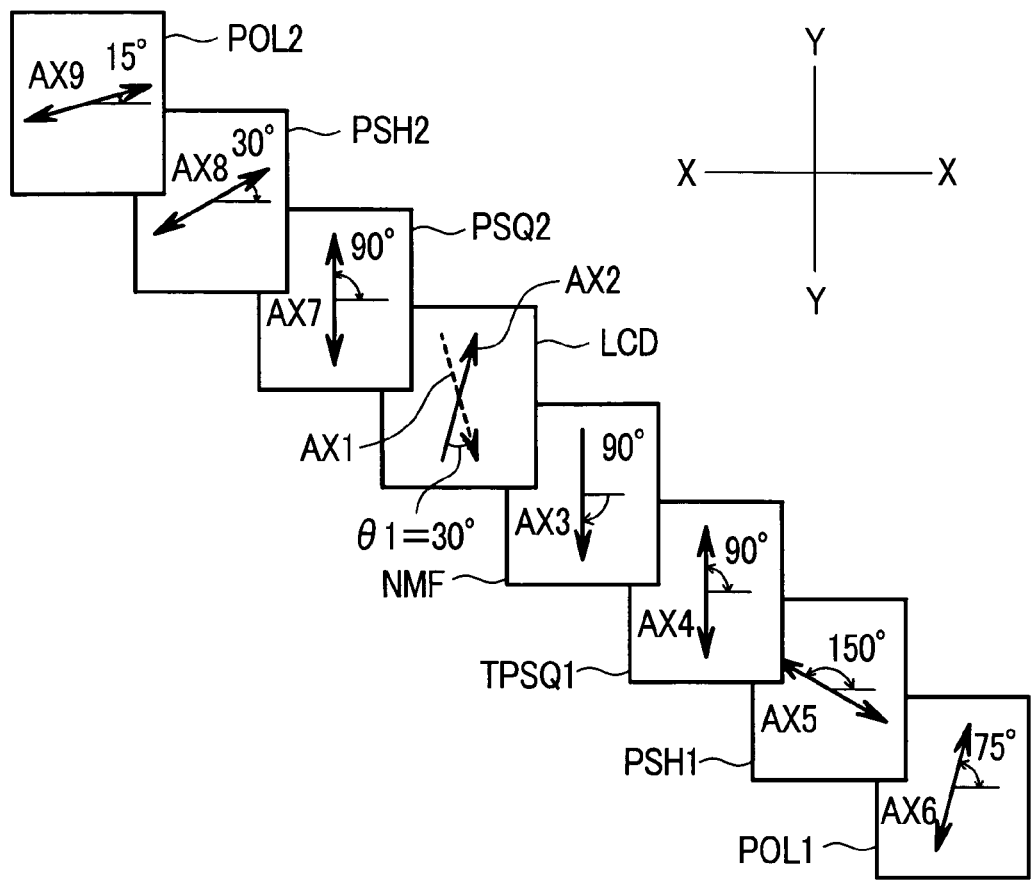
FIG. 7 is an explanatory view of the arrangement of optical axes of respective optical members of the liquid crystal display device having the stacked structure shown in FIG. 6.

FIG. 7 is an explanatory view of the arrangement of optical axes of respective optical members of the liquid crystal display device having the stacked structure shown in FIG. 6. Hereinafter, the definitions of the optical axes of the optical members are similar to the definitions used in the first embodiment. A light diffusion means such as diffusion tacky adhesive agent may be interposed between the semi-transmissive type liquid crystal display cell LCD and the upper λ/4 phase difference plate PSQ2, between the upper λ/4 phase difference plate PSQ2 and the upper λ/2 phase difference plate PSH2 and between the upper λ/2 phase difference plate PSH2 and the upper polarizer POL2. Further, a brightness promoting film adopting a polarization separation method may be arranged outside the lower polarizer POL1.

In the semi-transmissive type liquid crystal display cell LCD, Δnd of the transmitting portion at the wavelength of 550 nm is set to a value within a range of 250 nm to 400 nm (preferably, 300 nm). Further, Δnd of the reflecting portion at the wavelength of 550 nm is set to a value within a range of 130 nm to 250 nm (preferably, 200 nm). Further, a twist angle (angle formed between the orientation axis AX1 of the lower orientation film ORI1 and the orientation axis AX2 of the upper orientation film ORI2) θ1 of liquid crystal molecules is set to a value within a range of 0° to 90°. In this embodiment, in the same manner as FIG. 1, the twisting angle is set to 30°.

The phase lagging axis AX7 of the upper λ/4 phase difference plate PSQ2 is arranged within a range of −5° to +5° with respect to the direction which is rotated by 90° in the clockwise direction from a resultant vector of the orientation axis direction AX2 of the upper side orientation film ORI2 and the orientation axis direction AX1 of the lower orientation film ORI1 of the liquid crystal display cell LCD. In this embodiment, the angle is set to 0°. The phase lagging axis AX8 of the upper λ/2 phase difference plate PSH2 is arranged at an angle within a range of −70° to −50° from the phase lagging axis AX7 of the upper λ/4 phase difference plate PSQ2 and, in this embodiment, the angle is set to −60°. The absorption axis AX9 of the upper polarizer POL2 is arranged at an angle within a range of −25° to −5° from the phase lagging axis AX8 of the upper λ/2 phase difference plate PSH2 and, in this embodiment, the angle is set to −15°. Δnd (valley value) of the upper λ/4 phase difference plate PSQ2 is set to a value within a range of 50 nm to 200 nm and, in this embodiment, the Δnd is set to 100 nm. Δnd (valley value) of the upper λ/2 phase difference plate PSH2 is set to a value within a range of 200 nm to 300 nm and, in this embodiment, the Δnd is set to 255 nm.

The orientation axis direction AX3 of the optical film NMF having negative uniaxial double refractive index ellipsoids is arranged within an inclination range of −5° to +5° with respect to the direction which is rotated by 90° in the clockwise direction from a resultant vector of the orientation axis direction AX2 of the upper orientation film ORI2 and the orientation axis direction AX1 of the lower orientation film ORI1 of the liquid crystal display cell LCD. Here, in this embodiment, this inclination is set to 0°. Further, at a twist angle 0° where the resultant vector of the orientation axis directions AX2, AX1 of the upper and lower orientation films ORI2, ORI1 is not present, the orientation axis direction AX3 is arranged within an inclination range of −5° to +5° with respect to the orientation axis direction AX1 of the lower orientation film ORI1.

Figure 8:
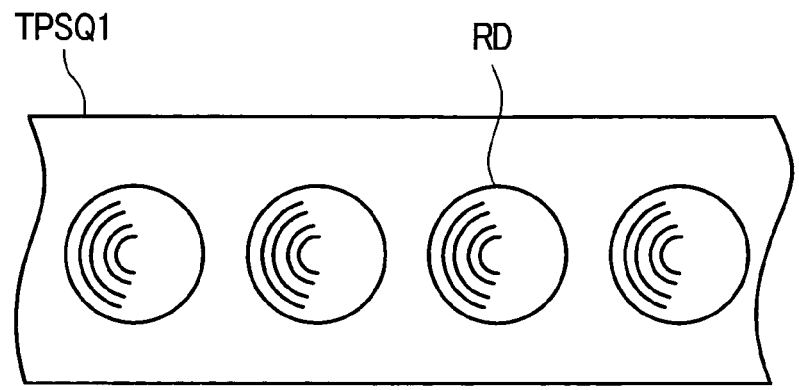
FIG. 8 is a schematic cross-sectional view for explaining the structure of a three-dimensional refractive index control type phase difference plate corresponding to λ/4.

FIG. 8 is a schematic cross-sectional view for explaining the structure of a three-dimensional refractive index control type phase difference plate corresponding to λ/4. In this lower three-dimensional refractive index control type phase difference plate TPSQ1 corresponding to λ/4, while an ordinary phase difference plate is extended in one axis direction, the three-dimensional refractive index control type phase difference plate is extended in the biaxial direction and hence, the refractive index distribution RD in the film is controlled in a three-dimensional manner. The light which passes through the optical film is irradiated as light having the comparatively small change of birefringence compared to an amount of change of birefringence of an ordinary phase difference plate corresponding to the incident angle of the transmitting light.

It is desirable that an $N_Z$ coefficient indicative of a three-dimensional refractive index of the three-dimensional refractive index control type phase difference plate corresponding to λ/4 is set to $-1 \leq N_Z < 1$. Here, $N_Z$ coefficient is expressed by a following formula.

$$N_Z = (n_x - n_z)/(n_x - n_y)$$

$n_x$: refractive index in the phase lagging axis direction $n_y$: refractive index in the phase advancing axis direction $n_z$: refractive index in the planar normal direction In FIG. 7, the phase lagging axis AX4 of the lower three-dimensional refractive index control type phase difference plate TPSQ1 is arranged at an angle within a range of −10° to +10° with respect to the orientation axis direction AX3 of the optical film NMF having negative uniaxial double refractive index ellipsoids. In this embodiment, the angle is set to 0°. The phase lagging axis AX5 of the lower λ/2 phase difference plate PSH1 is arranged at an angle within a range of 50° to 70° from the phase lagging axis AX4 of the lower three-dimensional refractive index control type phase difference plate TPSQ1. In this embodiment, the angle is set to 60°. An absorption axis AX6 of the lower polarizer POL1 is arranged at an angle within a range of −80° to −65° from the phase lagging axis AX5 of the lower λ/2 phase difference plate PSH1. In this embodiment, the angle is set to −75°. Δnd (valley value) of the lower three-dimensional refractive index control type phase difference plate TPSQ1 is set to a value within a range of 50 nm to 200 nm. In this embodiment, the Δnd is set to 140 nm. Δnd (valley value) of the lower λ/2 phase difference plate PSH1 is set to a value within a range of 200 nm to 300 nm. In this embodiment, the Δnd is set to 260 nm.

Due to the constitution of this embodiment, by using a reflecting light of an external light or by selectively or simultaneously using a transmitting light and a reflecting light, in both of an environment having a bright external light and a dark environment, bright clear images having a wide viewing angle and a high contrast ratio is obtained. Further, a color image display device of high quality with no color tone shift can be obtained.

Figure 9:
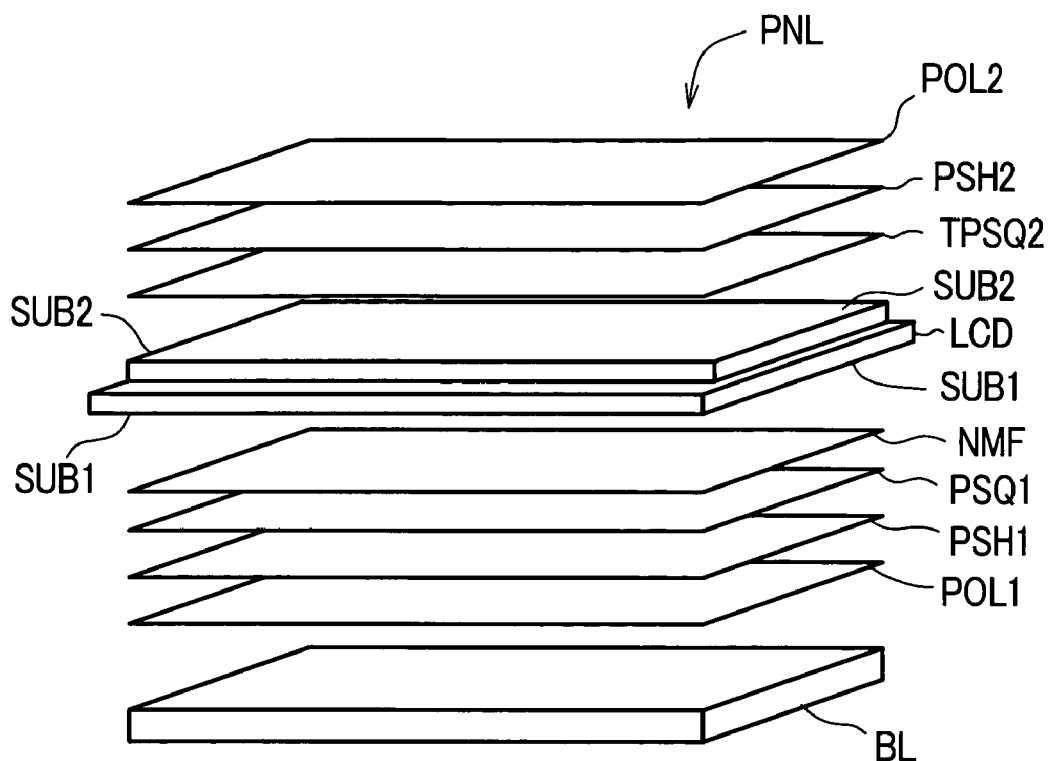
FIG. 9 is a developed view for explaining the stacked structure of respective optical members in the third embodiment of the liquid crystal display device according to the present invention.

FIG. 9 is a developed view for explaining the stacked structure of respective optical members in the third embodiment of the liquid crystal display device according to the present invention. Above (observation side) a semi-transmissive type liquid crystal display cell LCD, an upper three-dimensional refractive index control type phase difference plate TPSQ2 corresponding to λ/4, an upper λ/2 phase difference plate PSH2 and an upper polarizer POL2 are stacked in this order. Further, below the semi-transmissive type liquid crystal display cell LCD, an optical film NMF having negative uniaxial double refractive index ellipsoids is formed. Further, over the optical film NMF, a lower λ/4 phase difference plate PSQ1, a lower λ/2 phase difference plate PSH1 and a lower polarizer POL1 are stacked in this order.

The orientation axis direction AX3 of the optical film NMF having negative uniaxial double refractive index ellipsoids is arranged substantially equal to the direction which is rotated 90° in the clockwise direction from a resultant vector of the orientation axis direction AX2 of the upper orientation film ORI2 and the orientation axis direction AX1 of the lower orientation film ORI1 of the liquid crystal display cell LCD and, at the same time, the phase lagging axes AX7, AX4 of the upper and lower λ/4 phase difference plates TPSQ2, PSQ1 are arranged substantially equal to the orientation axis direction AX3 of the optical film NMF having negative uniaxial double refractive index ellipsoids. Here, at a twist angle 0° where the resultant vector of the orientation axes AX2, AX1 of the upper and lower orientation films ORI2, ORI1 is not present, the orientation axis direction AX3 of the optical film NMF having negative uniaxial double refractive index ellipsoids is arranged substantially equal to the orientation axis direction AX1 of the lower orientation film ORI1 of the liquid crystal display cell LCD.

Figure 10:
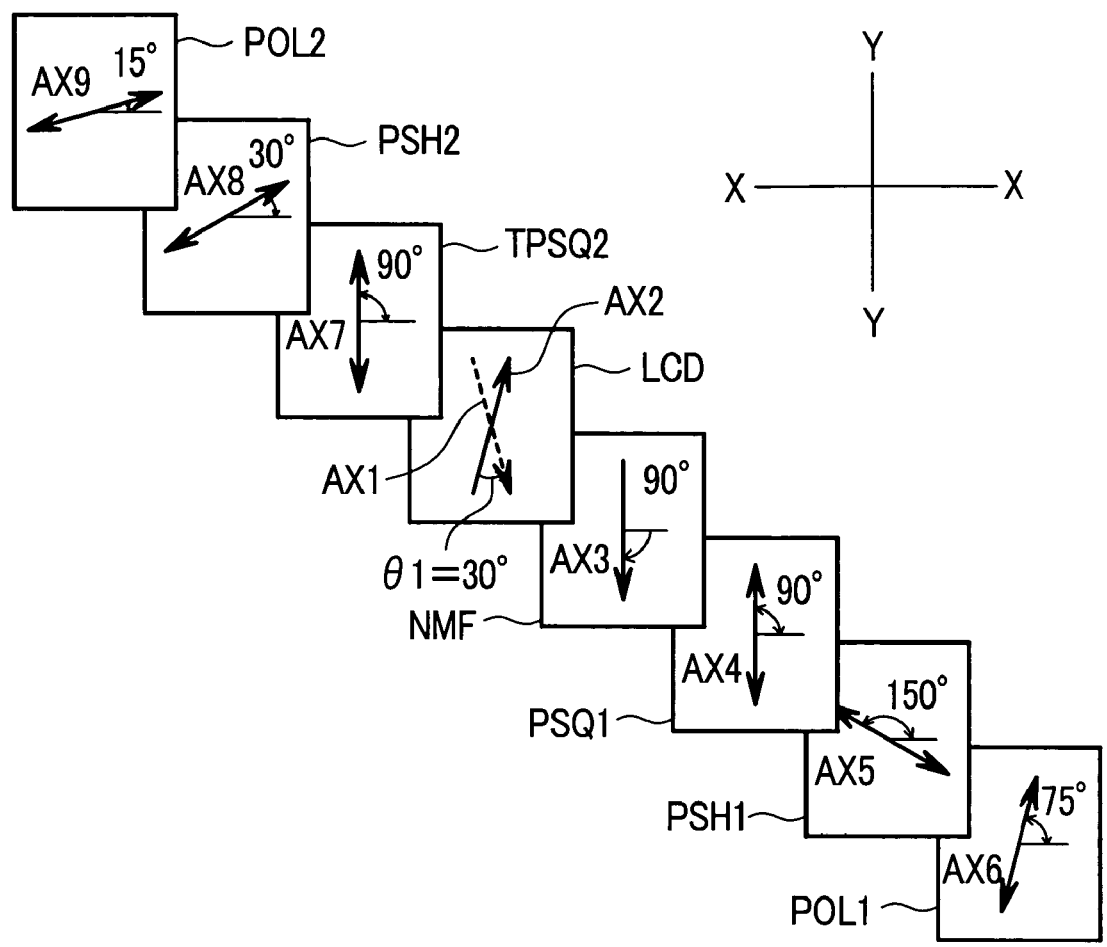
FIG. 10 is an explanatory view of the arrangement of optical axes of respective optical members of the liquid crystal display device having the stacked structure shown in FIG. 9.

FIG. 10 is an explanatory view of the arrangement of optical axes of respective optical members of the liquid crystal display device having the stacked structure shown in FIG. 9. Hereinafter, the definitions of the optical axes of the optical members are similar to the definitions used in the above-mentioned respective embodiments. Further, the absorption axes AX9, AX6 of the upper and lower polarizers POL2, POL1 may be used as transmission axes. Then, a light diffusion means such as a diffusion tacky adhesive agent may be interposed between the semi-transmissive type liquid crystal display cell LCD and the upper three-dimensional refractive index control type phase difference plate TPSQ2, between the upper three-dimensional refractive index control type phase difference plate TPSQ2 and the upper λ/2 phase difference plate PSH2, and between the upper λ/2 phase difference plate PSH2 and the upper polarizer POL2. Further, a brightness promoting film adopting a polarization separation method may be arranged outside the lower polarizer POL1.

In the semi-transmissive type liquid crystal display cell LCD, Δnd of the transmitting portion at the wavelength of 550 nm is set to a value within a range of 250 nm to 400 nm (preferably, 300 nm). Then, Δnd of the reflecting portion at the wavelength of 550 nm is set to a value within a range of 130 nm to 250 nm (preferably, 200 nm). Further, a twist angle (angle formed between the orientation axis AX1 of the lower orientation film ORI1 and the orientation axis AX2 of the upper orientation film ORI2) θ1 of liquid crystal molecules falls within a range of 0° to 90°. Further, in this embodiment, in the same manner as FIG. 1, the twist angle is set to 30°.

The phase lagging axis AX7 of the upper three-dimensional refractive index control type phase difference plate TPSQ2 is arranged within a range of –5° to +5° with respect to the direction which is rotated by 90° in the clockwise direction from a resultant vector of the orientation axis direction AX2 of the upper side orientation film ORI2 and the orientation axis direction AX1 of the lower orientation film ORI1 of the liquid crystal display cell LCD. In this embodiment, the angle is set to 0°. The phase lagging axis AX8 of the upper λ/2 phase difference plate PSH2 is arranged at an angle within a range of –70° to –50° from the phase lagging axis AX7 of the upper three-dimensional refractive index control type phase difference plate TPSQ2 and, in this embodiment, the angle is set to –60°. The absorption axis AX9 of the upper polarizer POL2 is arranged at an angle within a range of –25° to –5° from the phase lagging axis AX8 of the upper λ/2 phase difference plate PSH2 and, in this embodiment, the angle is set to –15°. Δnd (valley value) of the upper three-dimensional refractive index control type phase difference plate TPSQ2 is set to a value within a range of 50 nm to 200 nm and, in this embodiment, the Δnd is set to 100 nm. Δnd (valley value) of the upper λ/2 phase difference plate PSH2 is set to a value within a range of 200 nm to 300 nm and, in this embodiment, the Δnd is set to 255 nm. Here, it is desirable that an $N_z$ coefficient of the upper three-dimensional refractive index control type phase difference plate TPSQ2 is set to $-1 \leq N_z < 1$ in the same manner as the lower three-dimensional refractive index control type phase difference plate TPSQ1 as explained in conjunction with FIG. 8.

The orientation axis direction AX3 of the optical film NMF having negative uniaxial double refractive index ellipsoids is arranged within an inclination range of –5° to +5° with respect to the direction which is rotated by 90° in the clockwise direction from a resultant vector of the orientation axis direction AX2 of the upper orientation film ORI2 and the orientation axis direction AX1 of the lower orientation film ORI1 of the liquid crystal display cell LCD. Here, in this embodiment, this inclination is set to 0°. Further, at a twist angle 0° where the resultant vector of the orientation axis directions AX2, AX1 of the upper and lower orientation films ORI2, ORI1 is not present, the orientation axis direction AX3 is arranged within an inclination range of –5° to +5° with respect to the orientation axis direction AX1 of the lower orientation film ORI1.

The phase lagging axis AX4 of the lower λ/4 phase difference plate PSQ1 is arranged at an angle within a range of –10° to +10° with respect to the orientation axis direction AX3 of the optical film NMF having negative uniaxial double refractive index ellipsoids. In this embodiment, the angle is set to 0°. The phase lagging axis AX5 of the lower λ/2 phase difference plate PSH1 is arranged at an angle within a range of 50° to 70° from the phase lagging axis direction AX4 of the lower λ/4 phase difference plate PSQ1. In this embodiment, the angle is set to 60°. The absorption axis AX6 of the lower polarizer POL1 is arranged at an angle within a range of –85° to –65° from the phase lagging axis AX5 of the lower λ/2 phase difference plate PSH1. In this embodiment, the angle is set to –75°. Δnd (valley value) of the lower λ/4 phase difference plate PSQ1 is set to a value within a range of 50 nm to 200 nm. In this embodiment, the Δnd is set to 110 nm. Δnd (valley value) of the lower λ/2 phase difference plate PSH1 is set to a value within a range of 200 nm to 300 nm. In this embodiment, the Δnd is set to 260 nm.

Due to the constitution of this embodiment, by using a reflecting light of an external light or by selectively or simultaneously using a transmitting light and a reflecting light, in both of an environment having a bright external light and a dark environment, bright clear images having a wide viewing angle and a high contrast ratio can be obtained and, further, color image display device of a high quality with no color tone shift can be obtained.

Figure 11:
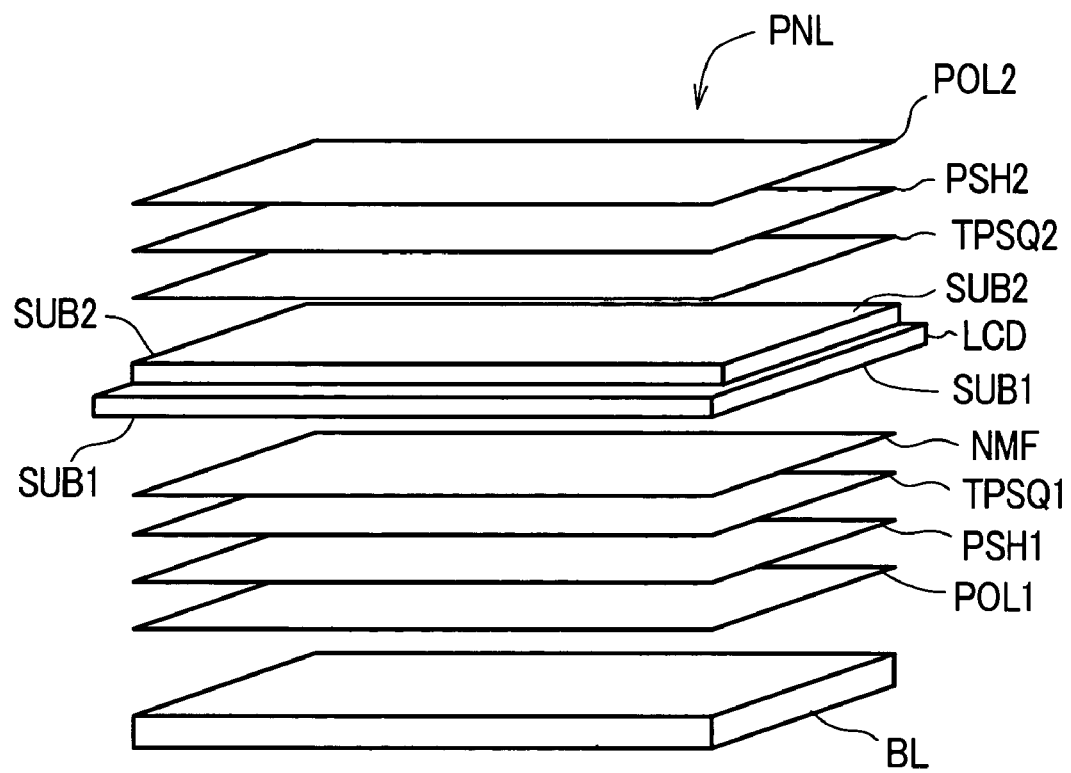
FIG. 11 is a developed view for explaining the stacked structure of respective optical members in the fourth embodiment of the liquid crystal display device according to the present invention.
Figure 11:
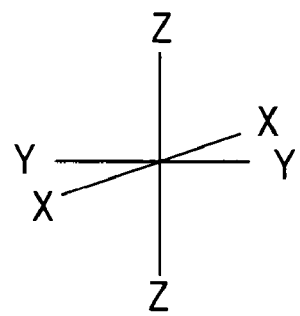
Figure 12:
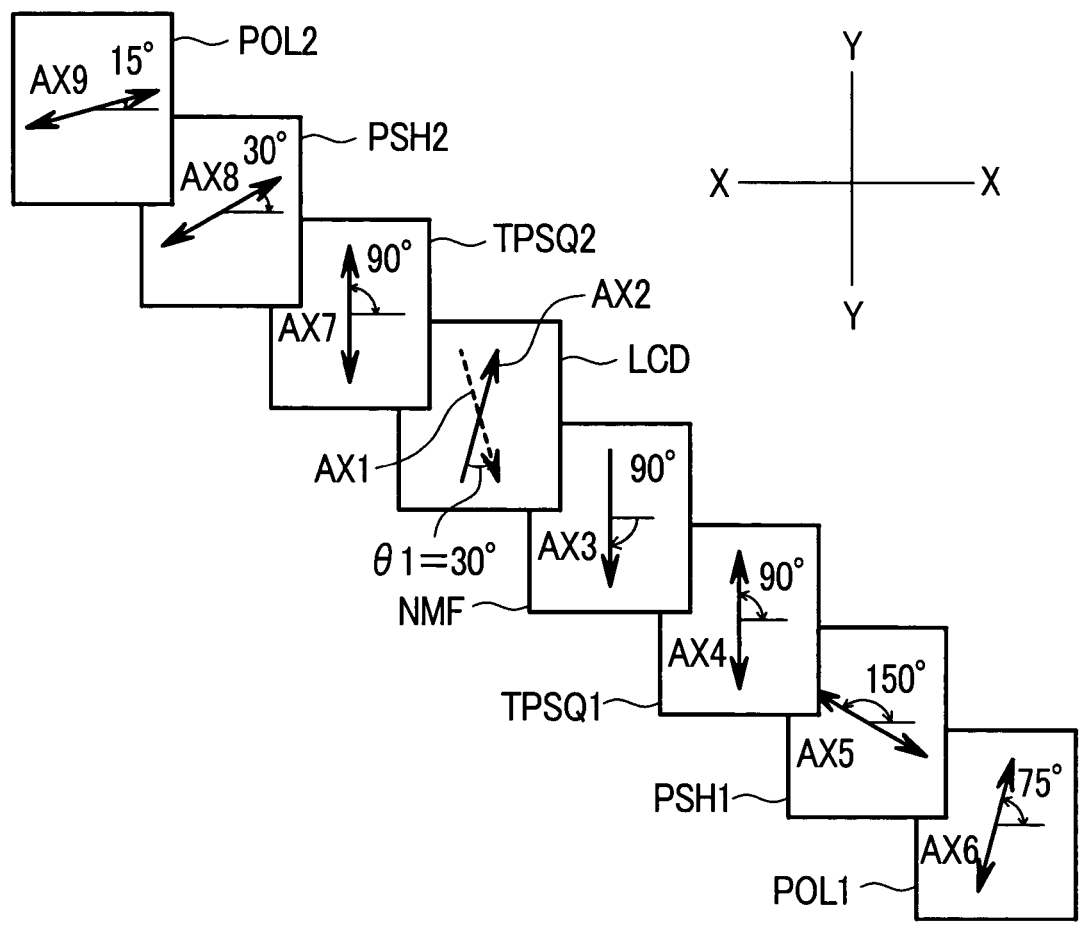
FIG. 12 is an explanatory view of the arrangement of optical axes of respective optical members of the liquid crystal display device having the stacked structure shown in FIG. 11.

FIG. 11 is a developed view for explaining the stacked structure of respective optical members in the fourth embodiment of the liquid crystal display device according to the present invention. Further, FIG. 12 is an explanatory view of the arrangement of optical axes of respective optical members of the liquid crystal display device having the stacked structure shown in FIG. 11. This embodiment is substantially equal to the third embodiment of the present invention which is explained in conjunction with FIG. 10 with respect to the constitution of the optical members stacked on the upper side of the liquid crystal display cell LCD and is substantially equal to the second embodiment of the present invention which is explained in conjunction with FIG. 7 with respect to the constitution of the optical members stacked on the lower side of the liquid crystal display cell LCD.

That is, over the upper side of the liquid crystal display cell LCD, the upper three-dimensional refractive index control type phase difference plate TPSQ2, the upper λ/2 phase difference plate PSH2, and the upper polarizer POL2 are stacked in this order, while over the lower side of the semi-transmissive type liquid crystal display cell LCD, the optical film NMF having negative uniaxial double refractive index ellipsoids, the lower three-dimensional refractive index control type phase difference plate TPSQ1, the lower λ/2 phase difference plate PSH1, and the lower polarizer POL1 are stacked in this order. The optical axes and the orientation axes of these respective optical members are substantially equal to the optical axes and the orientation axes explained in conjunction with FIG. 7 and FIG. 10.

Due to the constitution of this embodiment, by using a reflecting light of an external light or by selectively or simultaneously using a transmitting light and a reflecting light, in both of an environment having a bright external light and a dark environment, bright clear images having a wide viewing angle and a high contrast ratio can be obtained and, further, a color image display device of a high quality with no color tone shift can be obtained.

With respect to the first embodiment to the fourth embodiment which have been explained heretofore, the particularly important point lies in the arrangement method of the orientation axis direction AX3 of the optical film NMF having negative uniaxial double refractive index ellipsoids, the phase lagging axis AX4 of the lower λ/4 phase difference plate PSQ1 (lower three-dimensional refractive index control type phase difference plate TPSQ1) and the phase lagging axis AX7 of the upper λ/4 phase difference plate PSQ2 (upper three-dimensional refractive index control type phase difference plate TPSQ2) when the optical film NMF having negative uniaxial double refractive index ellipsoids is applied to the semi-transmissive type liquid crystal display device for enlarging the viewing angle.

In the conventional liquid crystal display device which is not provided with the optical film NMF having negative uniaxial double refractive index ellipsoids, various combinations can be considered with respect to the arrangement directions of these axes AX4, AX7. However, the case in which the optical film NMF having negative uniaxial double refractive index ellipsoids is applied has not been reviewed conventionally. To the contrary, by arranging these axes AX3, AX4, AX7 in the manners explained in the first embodiment to the fourth embodiment, the liquid crystal display device can obtain the high contrast, the wide viewing angle and, particularly the left-and-right symmetry with respect to the enlargement of the viewing angle. On the other hand, when the arrangement method of these axes AX3, AX4, AX7 exceeds this range, the characteristics are degraded.

Here, even when the range of the phase lagging axis AX7 of the upper λ/4 phase difference plate PSQ2 (upper three-dimensional refractive index control type phase difference plate TPSQ2) is set to a range of −10° to +10° from the given direction, it is possible to enlarge the viewing angle. However, to obtain the left-and-right symmetry with respect to the enlargement of the viewing angle, it is desirable to set the range of the lagging phase axis AX7 to the range of −5° to +5° from the given direction as explained in the embodiments.

Further, as described in the second embodiment to the fourth embodiment, by combining the lower three-dimensional refractive index control type phase difference plate TPSQ1 and/or the upper three-dimensional refractive index control type phase difference plate TPSQ2, it is possible to obtain the particularly excellent characteristics.

The liquid crystal display device according to the present invention is preferably used for low-power-consumption devices such as a display part of the mobile phone, a display part of a Personal Digital Assistant (PDA) or the like. However, the application of the liquid crystal display device according to the present invention is not limited to the above and it is needless to say that the liquid crystal display device can be used in a notebook type personal computer and various display monitors.

Further, the liquid crystal display device according to the present invention is not limited to an active matrix type liquid crystal display device which uses the thin film transistors in the above-mentioned embodiments. That is, the present invention is also applicable to a thin-film diode type liquid crystal display device, other active matrix type liquid crystal display device, or a simple matrix type liquid crystal display device.

As has been described heretofore, according to the present invention, it is possible to enhance the contrast in the semi-transmissive type liquid crystal display device and obtain a high brightness and a wide viewing angle by enlarging the viewing angle whereby it is possible to provide the liquid crystal display device which realizes the high-quality image display without a color tone shift in the viewing angle direction.

What is claimed is:

1. A semi-transmissive type liquid crystal display device comprising:
   a semi-transmissive type liquid crystal display cell having a lower substrate, an upper substrate which constitutes an observation side, a liquid crystal layer sandwiched between the lower substrate and the upper substrate, a lower orientation film which is formed over a surface of the lower substrate which is brought into contact with the liquid crystal layer, and an upper orientation film formed over a surface of the upper substrate which is brought into contact with the liquid crystal layer;
   an upper polarizer arranged at a side of the upper substrate opposite to the liquid crystal layer;
   an upper λ/2 phase difference plate arranged between the upper polarizer and the upper substrate;
   an upper λ/4 phase difference plate arranged between the upper λ/2 phase difference plate and the upper substrate;
   a lower polarizer arranged at a side of the lower substrate opposite to the liquid crystal layer;
   a lower λ/2 phase difference plate arranged between the lower polarizer and the lower substrate;
   a lower λ/4 phase difference plate arranged between the lower λ/2 phase difference plate and the lower substrate; and
   an optical film having negative uniaxial double refractive index ellipsoids arranged between the lower λ/4 phase difference plate and the lower substrate, wherein
   a twist angle of the liquid crystal layer is larger than 0° and equal to or smaller than 90°,
   the orientation axis direction of the optical film having negative uniaxial double refractive index ellipsoids is arranged within a range of −5° to +5° with respect to the direction which is rotated by 90° in the clockwise direction from a resultant vector of the orientation axis direction of the upper orientation film and the orientation axis direction of the lower orientation film of the liquid crystal display cell, and
   a phase lagging axis of the lower λ/4 phase difference plate is arranged within a range of −10° to +10° with respect to the orientation axis direction of the optical film having negative uniaxial double refractive index ellipsoids, and a phase lagging axis of the upper 4/λ phase difference plate is arranged within a range of −5° to +5° with respect to the direction which is rotated 90° in the clockwise direction from a resultant vector of the orientation axis direction of the upper orientation film and the orientation axis direction of the lower orientation film of the liquid crystal display cell.

2. A semi-transmissive type liquid crystal display device according to claim 1, wherein the lower λ/4 phase difference plate is formed of a three-dimensional refractive index control type phase difference plate having a $N_Z$ coefficient of $-1 \leq N_Z < 1$, wherein the $N_Z$ coefficient indicates a three-dimensional refractive index.

3. A semi-transmissive type liquid crystal display device according to claim 1, wherein the upper λ/4 phase difference plate is formed of a three-dimensional refractive index control type phase difference plate having a $N_Z$ coefficient of $-1 \leq N_Z < 1$, wherein the $N_Z$ coefficient indicates a three-dimensional refractive index.

4. A semi-transmissive type liquid crystal display device according to claim 1, wherein both of the lower λ/4 phase difference plate and the upper λ/4 phase difference plate are formed of a three-dimensional refractive index control type phase difference plate having a $N_Z$ coefficient of $-1 \leq N_Z < 1$, wherein the $N_Z$ coefficient indicates a three-dimensional refractive index.

5. A semi-transmissive type liquid crystal display device according to claim 1, wherein the liquid crystal display device includes a backlight.

6. A liquid crystal display device comprising:
a semi-transmissive type liquid crystal display cell having a lower substrate, an upper substrate which constitutes an observation side, a liquid crystal layer sandwiched between the lower substrate and the upper substrate, a lower orientation film which is formed over a surface of the lower substrate which is brought into contact with the liquid crystal layer, and an upper orientation film formed over a surface of the upper substrate which is brought into contact with the liquid crystal layer;
an upper polarizer arranged at a side of the upper substrate opposite to the liquid crystal layer;
an upper λ/2 phase difference plate arranged between the upper polarizer and the upper substrate;
an upper λ/4 phase difference plate arranged between the upper λ/2 phase difference plate and the upper substrate;
a lower polarizer arranged at a side of the lower substrate opposite to the liquid crystal layer;
a lower λ/2 phase difference plate arranged between the lower polarizer and the lower substrate;
a lower λ/4 phase difference plate arranged between the lower λ/2 phase difference plate and the lower substrate; and
an optical film having negative uniaxial double refractive index ellipsoids arranged between the lower λ/4 phase difference plate and the lower substrate, wherein
a twist angle of the liquid crystal layer is 0°,
the orientation axis direction of the optical film having negative uniaxial double refractive index ellipsoids is arranged within a range of −5° to +5° with respect to the orientation axis direction of the lower orientation film of the liquid crystal display cell, and
a phase lagging axis of the lower λ/4 phase difference plate is arranged within a range of −10° to +10° with respect to the orientation axis direction of the optical film having negative uniaxial double refractive index ellipsoids, and a phase lagging axis of the upper λ/4 phase difference plate is arranged within a range of −5° to +5° with respect to the orientation axis direction of the upper orientation film of the liquid crystal display cell.

7. A semi-transmissive type liquid crystal display device according to claim 6, wherein the lower λ/4 phase difference plate is formed of a three-dimensional refractive index control type phase difference plate having a $N_Z$ coefficient of $-1 \leq N_Z < 1$, wherein the $N_Z$ coefficient indicates a three-dimensional refractive index.

8. A semi-transmissive type liquid crystal display device according to claim 6, wherein the upper λ/4 phase difference plate is formed of a three-dimensional refractive index control type phase difference plate having a $N_Z$ coefficient of $-1 \leq N_Z < 1$, wherein the $N_Z$ coefficient indicates a three-dimensional refractive index.

9. A semi-transmissive type liquid crystal display device according to claim 6, wherein both of the lower λ/4 phase difference plate and the upper λ/4 phase difference plate are formed of a three-dimensional refractive index control type phase difference plate having a $N_Z$ coefficient of $-1 \leq N_Z < 1$, wherein the $N_Z$ coefficient indicates a three-dimensional refractive index.

10. A semi-transmissive type liquid crystal display device according to claim 6, wherein the liquid crystal display device includes a backlight.

* * * * *